(12) United States Patent
Yoshimura et al.

(10) Patent No.: US 8,281,510 B2
(45) Date of Patent: Oct. 9, 2012

(54) PLASTIC SHEET, AND DECORATIVE ILLUMINATION SIGNBOARD

(75) Inventors: Osamu Yoshimura, Chiyoda-ku (JP); Tatsuya Ueda, Tainai (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 12/996,468

(22) PCT Filed: Jun. 4, 2009

(86) PCT No.: PCT/JP2009/060270
§ 371 (c)(1),
(2), (4) Date: Dec. 6, 2010

(87) PCT Pub. No.: WO2009/148128
PCT Pub. Date: Dec. 10, 2009

(65) Prior Publication Data
US 2011/0088299 A1    Apr. 21, 2011

(30) Foreign Application Priority Data
Jun. 5, 2008  (JP) ................................ 2008-148462

(51) Int. Cl.
*G09F 13/00*    (2006.01)
(52) U.S. Cl. .......................................... 40/568; 362/330
(58) Field of Classification Search .................... 40/568, 40/582; 362/330, 97.1, 97.2, 97.3, 97.4, 362/606, 607
See application file for complete search history.

(56) References Cited

U.S. PATENT DOCUMENTS
6,075,649 A    6/2000  Naito

FOREIGN PATENT DOCUMENTS
JP    8-62428    3/1996
JP    8 278760   10/1996
JP    11-305011  11/1999
(Continued)

OTHER PUBLICATIONS
International Search Report issued Jul. 7, 2009 in PCT/JP09/060270 filed Jun. 4, 2009.
(Continued)

*Primary Examiner* — Joanne Silbermann
(74) *Attorney, Agent, or Firm* — Oblon, Spivak, McClelland, Maier & Neustadt, L.L.P.

(57) ABSTRACT

An object of the present invention is to provide a decorative illumination signboard capable of effectively downwardly emitting light while suppressing an upward emission of light with a simple configuration and a plastic sheet used in the decorative illumination signboard.
The object can be accomplished by a plastic sheet having optical transparency which includes an exit surface and an incident surface on which a plurality of prism lines having a flat and smooth surface are arranged to be aligned. A shape of the prism in a cross-section perpendicular to a longitudinal direction of the prism line is formed by a side A on a lower side at an angle of α degrees to a normal line of the exit surface and a side B on an upper side at an angle of β degrees to the normal line of the exit surface and α<β, and 40 degrees≦β≦80 degrees. An integral value of a downwardly emitted light flux is 55% or more of the total integral value of an upwardly emitted light flux and the downwardly emitting light flux when predetermined diffusion light enters one surface of the plastic sheet in a direction perpendicular to the plastic sheet.

14 Claims, 5 Drawing Sheets

FOREIGN PATENT DOCUMENTS

| | | |
|---|---|---|
| JP | 2000 193809 | 7/2000 |
| JP | 2000 227772 | 8/2000 |
| JP | 2001-343507 | 12/2001 |
| JP | 2007 103322 | 4/2007 |
| KR | 10-2001-0012365 | 2/2001 |
| KR | 10-2005-0043723 | 5/2005 |

OTHER PUBLICATIONS

Office Action issued Jan. 6, 2012 in Korean Patent Application No. 10-2011-7000009.

1 – Plastic Sheet
5 – Flat Exit Surface
6 – Incident Surface
7 – Prism
8 – Lower Side A
9 – Normal Line
10 – Upper Side B
11 – Curved Surface Portion

FIG. 3 ratio R = r/p = 0, 10, 20, 30%

1 – Plastic Sheet
5 – Flat Exit Surface
6 – Incident Surface
7 – Prism
11 – Curved Surface Portion
12 – Pitch P of Prism Lines
13 – Radius r of the Arc

PLASTIC SHEET, AND DECORATIVE ILLUMINATION SIGNBOARD

TECHNICAL FIELD

The present invention relates to a plastic sheet which is used for illumination of a signboard or the like and a decorative illumination signboard using the plastic sheet.

BACKGROUND ART

In a conventional displaying apparatus, for example, a decorative illumination signboard, a fluorescent light source and a light reflector are disposed underneath an opaque plate on which an advertising medium is printed to isotropically diffuse a light flux emitted from the light source.

In recent years, along with an appearance of tall buildings, so-called suburban restaurants, convenience stores, and gas stations, in order to improve visibility from far, a decorative illumination signboard which can be mounted on a high place of a building have been increased.

The decorative illumination signboard as mentioned above isotropically scatters the light flux so that the light flux is radiated in a direction toward the sky where no specifically intended person exists and therefore, energy is vainly wasted. Furthermore, the unnecessary light flux causes the night sky to be brightened up, and there is a problem of so-called light pollution.

Therefore, in Patent Document 1 mentioned below, a deflection sheet which has a prism and deflects the light radiated by the light source in a downward direction is proposed. In the deflection sheet in Patent Document 1, microscopic protrusions are provided on a non-significant surface of the prism in order to scatter the light which enters the non-significant surface and causes an upwardly emitting component so that the upwardly emitting component is reduced. However, it is assumed that producing a die or shaping so as to provide the microscopic protrusions on one of light controlling surfaces of the prism sheet is difficult.

Patent Document 1: Japanese Patent Application Publication No. 2000.193809

SUMMARY OF THE INVENTION

An object of the present invention is to provide a decorative illumination signboard capable of restraining an upwardly emitted light with a simple structure and efficiently emitting light downwardly and a plastic sheet used in the decorative illumination signboard.

Figure 4:
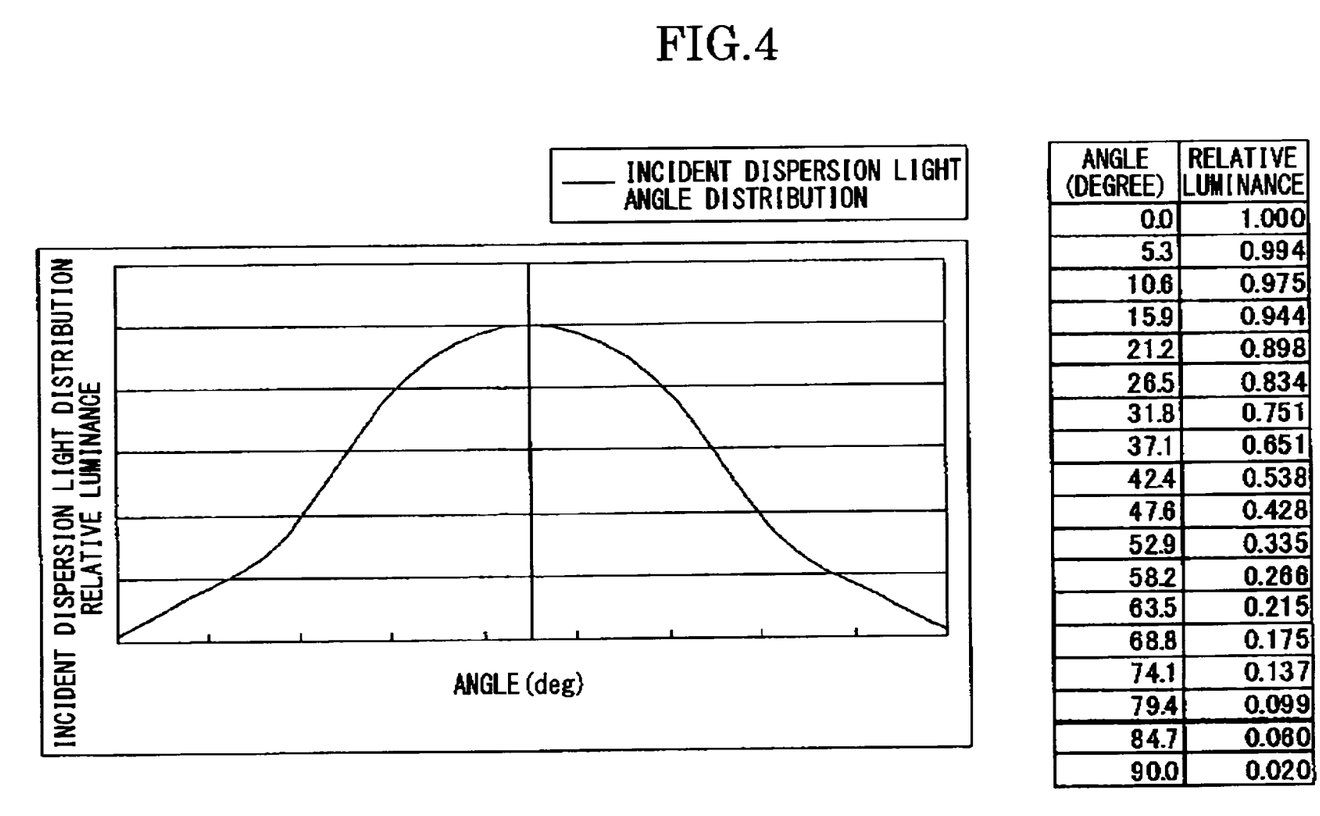
FIG. 4 is a view showing a luminance angle distribution of a predetermined diffusion light.

The aforementioned object can be accomplished by a light-transmitting plastic sheet having an exit surface and an incident surface on which two or more lines of a prism having a smooth surface are disposed. A shape of the prism in a cross-section perpendicular to a longitudinal direction of the prism lines is formed by a side A on a lower side at an angle of $\alpha$ degrees to a normal line of the exit surface and a side B on an upper side at an angle of $\beta$ degrees to the normal line of the exit surface. It is satisfied that $\alpha<\beta$, and 40 degrees$\leq\beta\leq$80 degrees so that an integral value of an downwardly emitted light flux is 55% or more of the total integral value of an upwardly emitted light flux and the downwardly emitted light flux when predetermined diffusion light enters one surface of the plastic sheet in a direction perpendicular to the plastic sheet. Here, the predetermined diffusion light in the present embodiment has a luminance angle distribution as shown in FIG. 4 in up-down directions. Tables show only about the emitted angle in a positive direction, but it is the same manner even in a negative direction.

The plastic sheet may be configured to have a curved-surface portion provided on a top part of the prism. Also, $\alpha$ may preferably be in a range of 0 degree$<\alpha<$60 degrees. Further, the present invention relates to the decorative illumination signboard which includes the above-described plastic sheet and a light source device provided on an incident surface side of the plastic sheet.

EFFECTS OF INVENTION

A sheet of the present invention includes a prism having a smooth surface and a specific cross-sectional shape. Therefore, diffusion light flux emitted by a light source can be effectively deflected in a downward direction where an observer exists.

Further, by providing the curved-surface portion on the tip part of the prism and adjusting a curvature radius and a proportion of the curved-surface portion to pitch of the prism, the tip of the prism is prevented from being damaged even when contacting with an other member, and a sudden change of viewing angles can be controlled.

Furthermore, the prism surface in the sheet of the present invention is flat and smooth so that it is easy to produce the sheet of the present invention.

MODE FOR CARRYING OUT THE INVENTION

Figure 1:
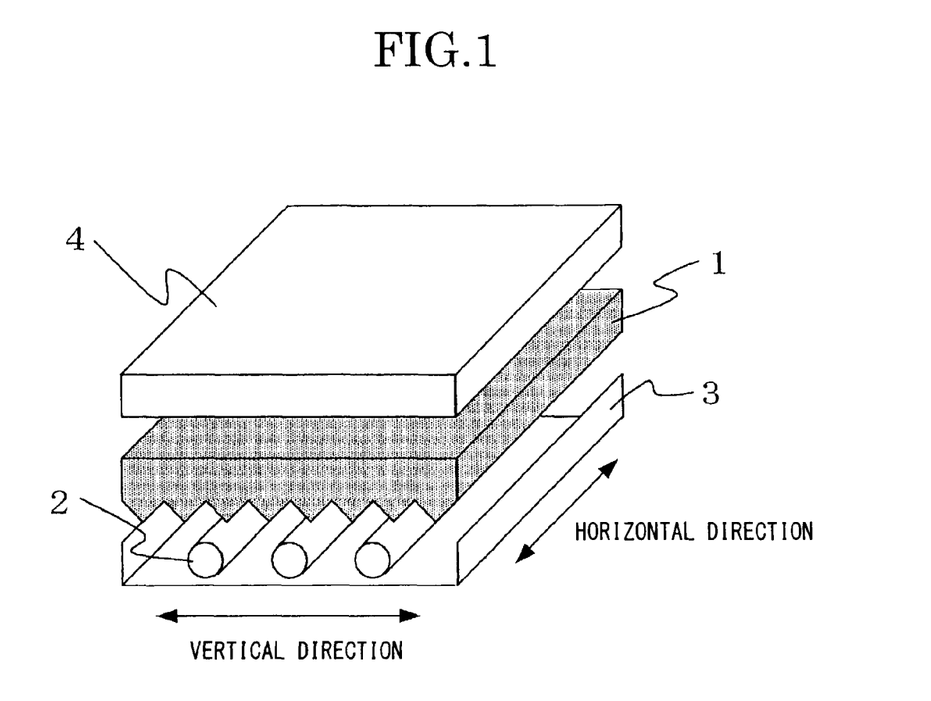
FIG. 1 is a view showing an example of a structure of a decorative illumination signboard of the present invention.

As depicted in FIG. 1, a plastic sheet 1 according to the present invention is disposed between a light source 2 and a reflecting member 3, and a display panel 4 such as an opaque plate on which a design is printed to be used.

Figure 2:
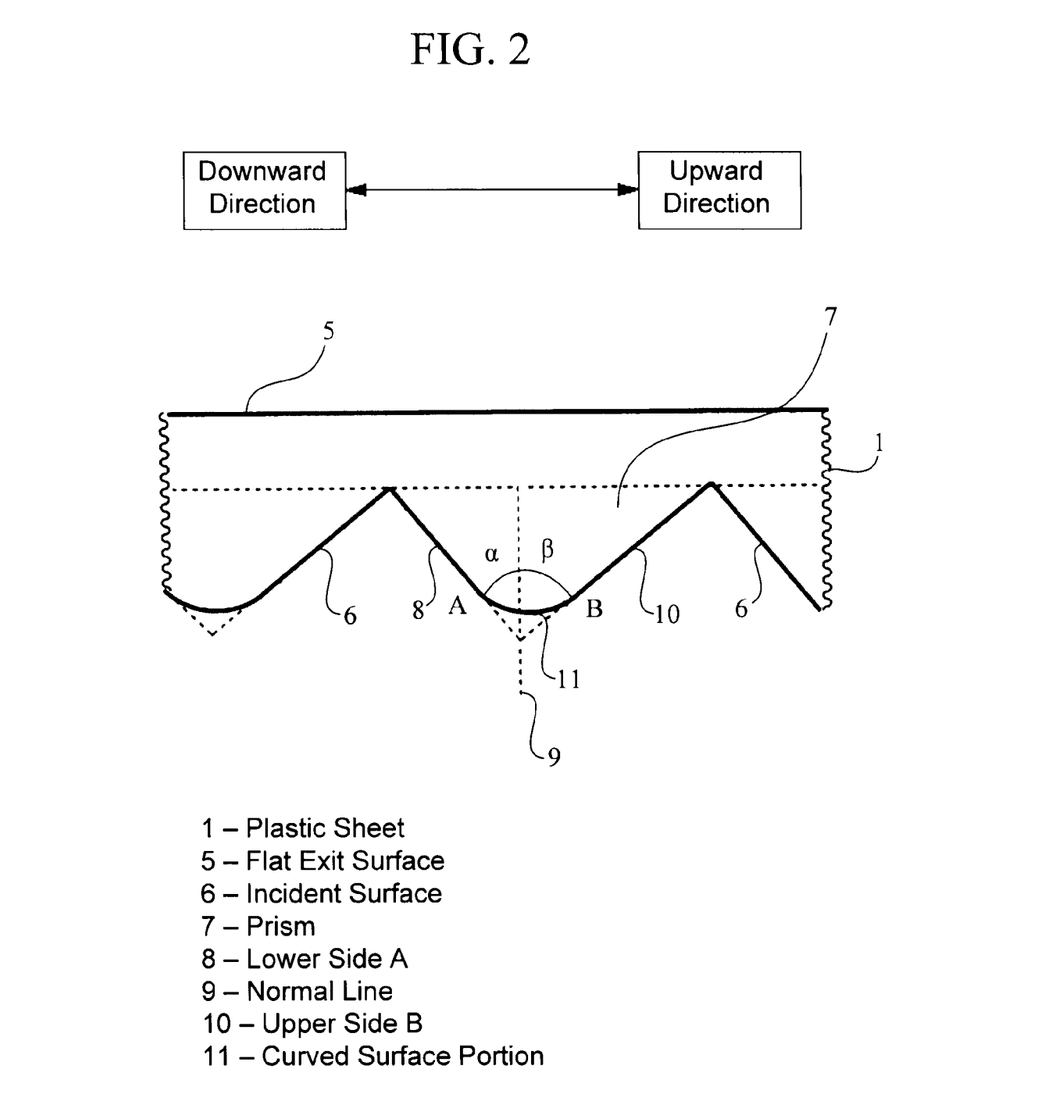
FIG. 2 is a view showing a cross-section of the plastic sheet of the present invention.

An example of a cross-sectional shape of the plastic sheet 1 is shown in FIG. 2. The plastic sheet in the example includes a flat exit surface 5 and an incident surface 6 on which lines of prisms 7 having a smooth surface are provided. The cross-section of the prism is formed by a lower side A 8 having an angle of $\alpha$ degree to a normal line 9 of the exit surface and an upper side B 10 having an angle of $\beta$ degrees to the normal line of the exit surface. Further in FIG. 2, an arc curved-surface portion 11 is formed on a top part of the prism.

When predetermined diffusion light enters the incident surface 6 in a direction perpendicular to the plastic sheet 1, by satisfying a condition of $\alpha<\beta$ and 40 degrees$\leq\beta\leq$80 degrees, it is possible to increase a percentage of light rays which are deflected downwardly.

In this case, it is preferable to satisfy $\alpha>0$ degree. This is because, if $\alpha$ is negative, producing a forming die for forming a prism shape and releasing a formed product from the forming die are difficult, and light refracted at the side B is reflected on the side A to beam upwardly directed light to be emitted.

In order to reduce the upwardly emitted light, it is preferable to satisfy that 0 degree<α<60 degrees, and more preferably, 20 degrees≦α≦45 degrees. Further, it is required that 40 degrees≦β≦80 degrees, and more preferably, 45 degrees≦β≦80 degrees. When β is in this range, the light can be effectively deflected even if the light source emits diffusion light.

It is preferable to satisfy that 40 degrees≦α+β≦105 degrees. In this range, the light can be effectively deflected even when the light source emits the diffusion light. If it is smaller than the range, it may cause problems such that forming the prism becomes difficult and the prism tip tends to be damaged.

Figure 3:
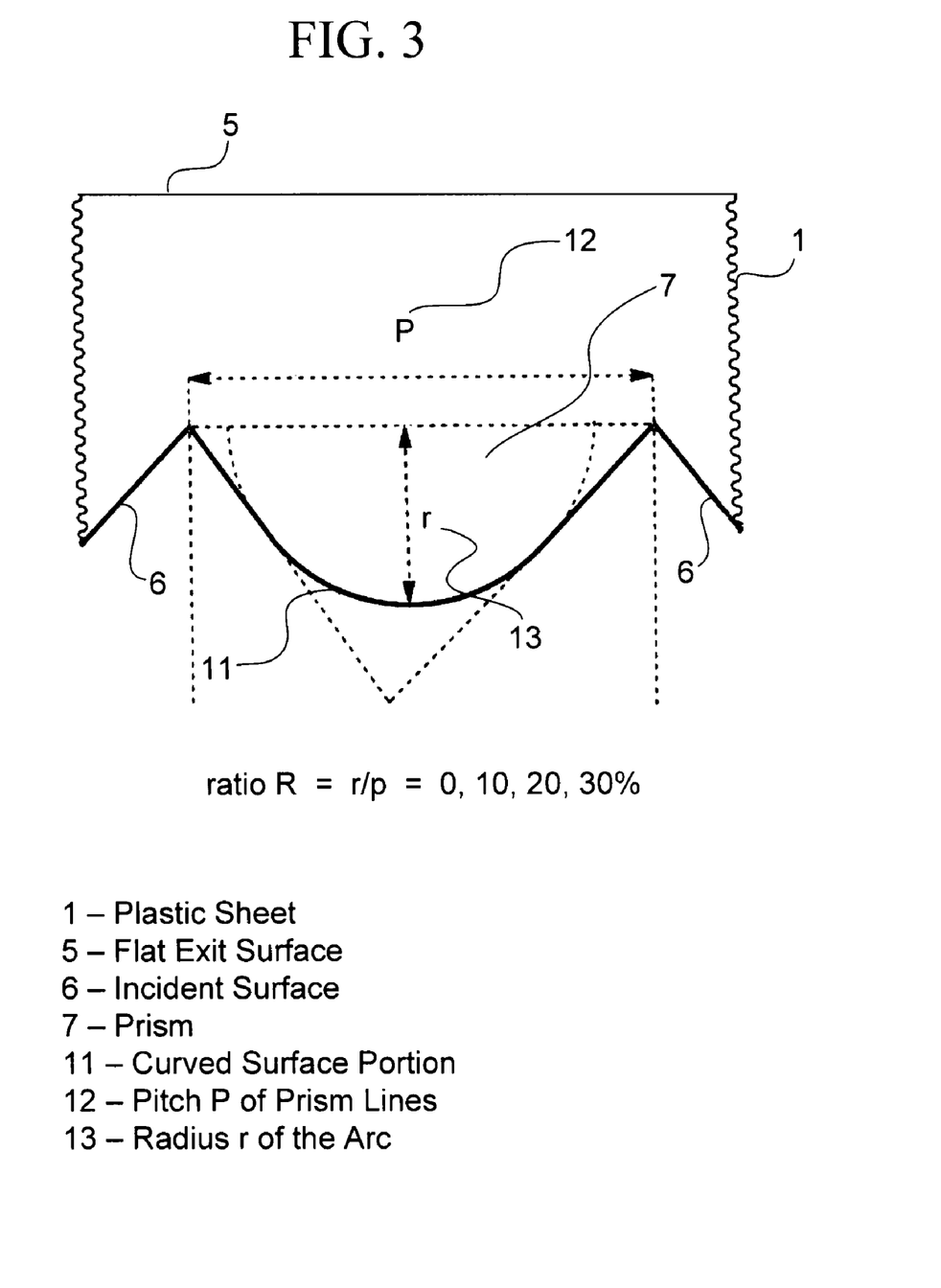
FIG. 3 is an enlarged cross-sectional view of a curved-surface portion provided on a top part of a prism.

As depicted in FIG. 3, when the arc curved-surface portion 11 is formed on the prism tip, a ratio R of a pitch P 12 of the prism lines to a radius r 13 of the arc is preferably 5% or more and 30% or less. If it is less than 5%, an effect for damage prevention may not be enough. If it is more than 30%, the effect for light deflection by the prism lines may not be enough.

Further, on a conventional display apparatus, it is required to reduce unevenness of brightness in a case where the display is observed in a frontal direction. In contrast, on the signboard located on a high position, it is required to reduce the unevenness of brightness within the display surface in a case where the display is observed from below. The unevenness of brightness is preferably within a luminance change rate 15%/2 degrees in the range of downwardly 10 degrees to downwardly 45 degrees of the viewing angle in up-down directions, and more preferably, within a luminance change rate 5%/3 degrees in the range of downward 20 degrees to downward 40 degrees of the viewing angle in the up-down directions.

Figure 5:
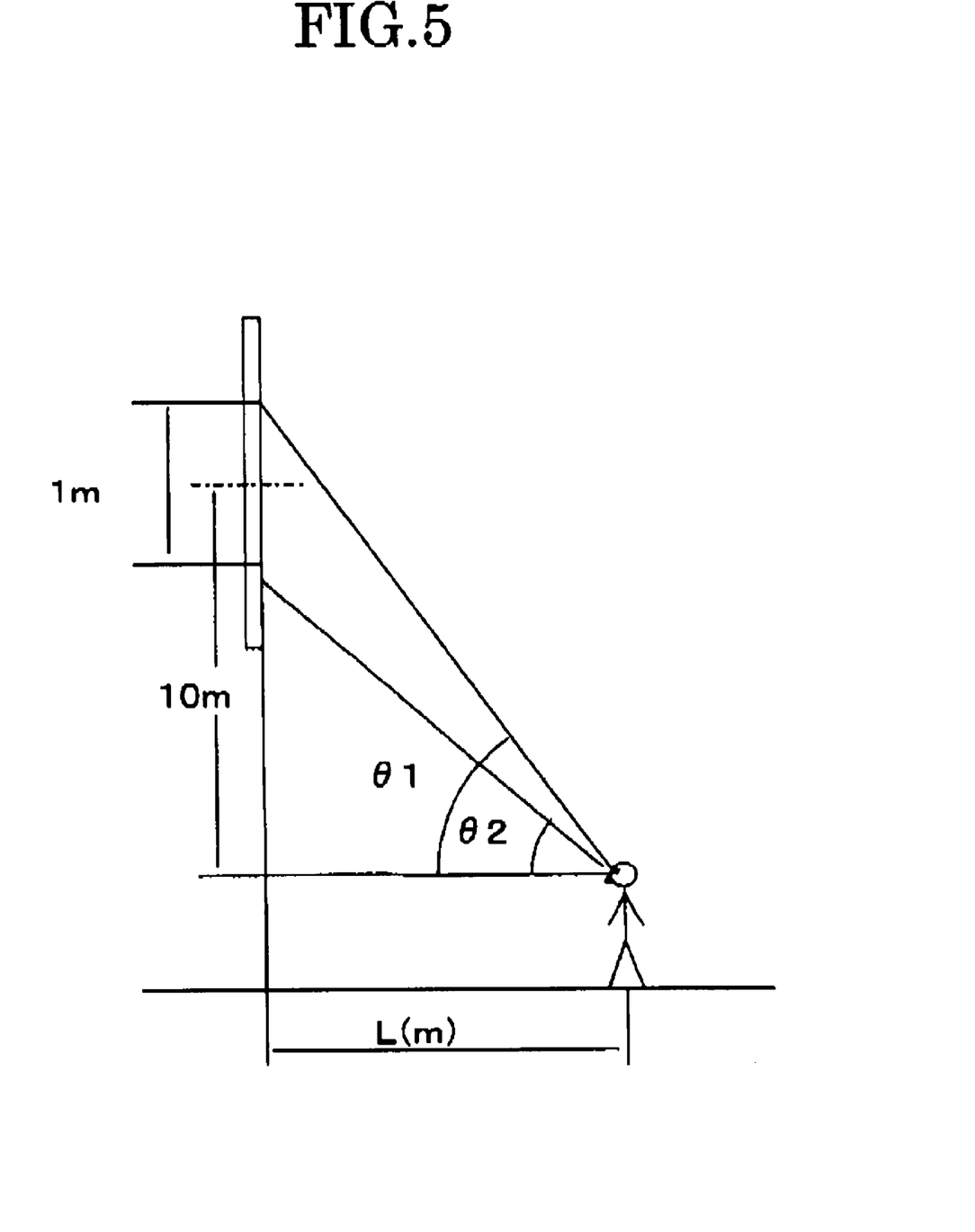
FIG. 5 is a view showing an example of a situation in which the decorative illumination signboard is observed.

This is in consideration of, for example, an angle for viewing a portion of an up-down dimension of 1 m of a displaying part located at a position of 10 m above the eye level from a position at a distance of L(m) away from a position directly underneath the displaying part (θ1 or θ2 shown in FIG. 5) and measure between an angle for viewing an upper edge of the displaying part and an angle for viewing a bottom edge of the displaying part (θ1-θ2).

First, in consideration of a visual field of human, when the displaying part is close (L≦10 m), a degree of the brightness and the unevenness of brightness are not important in a case where a person upwardly views the displaying part at the angle of upward 45 degrees or more (the displaying device is viewed from the angle of downward 45 degrees or more). Next, when the displaying part is viewed upwardly from far (L≧60 m), the measure between the angle for viewing the upper edge and the angle for viewing the bottom edge of the displaying part (θ1-θ2) becomes less than 1 degree so that a viewer feels that the display is too small. Therefore, in this case also, the degree of the brightness and the unevenness of brightness are not important. In consideration of this, in this example, the degree of the brightness and the unevenness of brightness is important in a case where a person upwardly views the displaying part at the angle of upward 10 degrees or more and 45 degrees or less (the displaying device is viewed from the angle of downward 10 degrees or more and 45 degrees or less).

Therefore, the unevenness of brightness is important with the viewing angle in the up-down direction in a range of downwardly 10 degrees to 45 degrees, especially 20 degrees to 40 degrees and with a visual angle in a range of 2 degrees to 3 degrees as the signboard located at a high position.

In addition, the reason that a visual viewing field of an up-down dimension of 1 m is evaluated even when the up-down dimension of the displaying part is larger than 1 m is because differences in the brightness between portions separated more than 1 m on the display surface are hardly visible.

The plastic sheet according to the present invention may include the prism lines only on the exit surface, or on both of the exit and incident surfaces. In a side of the exit surface, from a reason that it is easy to provide a light-transmitting display sheet or the like as a display member 4 or to directly form a design, the exit surface is preferably flat, as shown in FIG. 2.

The plastic sheet 1 according to the present invention is made of a light transmissive resin, and an intended shape of the molding product can be obtained by transcribing the shape by an inverse form of the molding product. As a concrete example of a molding method, an extrusion molding, press molding, ultraviolet curing molding using ultraviolet curable resin or the like can be applied. However, in consideration of the fact that the signboard is used outdoors in most cases, it is preferable to apply the method other than the ultraviolet curing molding method which is inferior in performance of ultraviolet resistance. It is more preferable to apply transparent resin such as metacrylic resin, polycarbonate resin or the like and perform the extrusion molding so that the molding product which has high productivity and the prism top configured to become the arc curved-surface portion because of shaping return can be obtained.

On the extrusion molding, in order to improve transcription performance in fully filling the resin into a molding die, it is preferred to enlarge the pitch P of the prism and to minify thickness t of the sheet. The pitch P of the prism lines is preferred to be 0.03 mm or more and 3 mm or less, more preferably, 0.2 mm or more. If it is less than 0.03 mm, the molding may be difficult. If it is more than 3 mm, a pattern of the prism lines may stand out through the display panel.

The sheet has preferably a thickness of 0.3 mm or more and 5 mm or less, more preferably, 0.5 mm or more. For example, in consideration of the transcription performance on the extrusion molding method, a value of P/t is preferred to be 1 or more.

Further, in the plastic sheet 1 of the present invention, roughening treatment for scattering a light flux, printing of low refractive material or the like can be performed on the exit surface. In addition, a light diffusing agent, an antistatic agent or the like can be blended into the plastic sheet 1 of the present invention.

On the side of incident surface of the plastic sheet 1 of the present invention, the light source 2 is provided so that a backlight source for a decorative illumination signboard can be configured.

Various known material can be applied for the light source 2 which is provided on the side of the incident surface of the plastic sheet 1. However, the material which emits the diffusion light is preferred because it is easily available and has a simple configuration.

When the light source 2 is a linear light source or point light sources linearly aligned, it is preferred to match a longitudinal direction of the light source with the longitudinal direction of the prism lines so that the unevenness of brightness caused by alignment of the light source can be reduced.

The decorative illumination signboard can be obtained by providing the display member 4 on the side of the exit surface of the backlight source. The display member 4 may be a transparent or translucent sheet or film on which a letter or a graphic are drawn, or may be a light-transmitting image display element such as a liquid crystal panel. Or it may be such that a letter or a graphic are directly drawn on the exit surface of the plastic sheet.

Embodiments

Embodiments according to the present invention will be explained with reference to the accompanying drawings.

As the plastic sheet 1 according to the present invention, a prism sheet including a smooth exit surface, as shown in FIG. 2 and an incident surface having a prism lines was prepared. In the prism sheet, if α, β and R are changed, a view angle characteristic in each of changed α, β and R when parallel light and diffusion light enters the incident surface was calculated by use of the following method and a proportion of an integral value of downwardly emitted light fluxes to a total integral value of upwardly emitted light fluxes and the downwardly emitted light fluxes was obtained. A case where an arc which is an incircle as shown in FIG. 3 is provided on a tip of the prism is also shown, and a proportion of a size of the arc to a prism pitch is set to be 0%, 20%, 30%, respectively (0% indicate a case where the arc is not provided).

<A Detailed Calculation Method>

Name of used program: Light Tools Ver 6.0.0 made by Optical Research Associates Co., Ltd Calculation Condition:

Refractive index: 1.549

Effective passage number on interface: 1 million times

Light-ray power's threshold value: 0.1

Integral calculation method: quadrature by parts, in increment of 5 degrees

Table 1 shows a proportion of downwardly emitted light fluxes to light fluxes emitted when parallel light enters the incident surface in a vertical direction, as obtained by the aforementioned calculation.

TABLE 1

| α (°) | β (°) | Proportion of Downwardly Emitted Light-Fluxes | | | |
|---|---|---|---|---|---|
| | | R = 0% | R = 10% | R = 20% | R = 30% |
| 0 | 20 | 35% | 37% | 46% | X |
| | 40 | 75% | 70% | 71% | X |
| | 60 | 86% | 85% | X | X |
| | 80 | 99% | X | X | X |
| 20 | 40 | 63% | 59% | 57% | X |
| | 60 | 88% | 79% | 72% | X |
| | 80 | 98% | 93% | X | X |
| 40 | 60 | 78% | 71% | 66% | 62% |
| | 80 | 96% | 91% | X | X |
| 45 | 45 | 50% | 50% | 50% | 50% |
| | 60 | 73% | 68% | 64% | 61% |
| | 80 | 95% | 90% | 86% | X |
| 60 | 80 | 88% | 85% | 81% | 78% |

X: There is no datum or incircle satisfying a condition

Values in shaded frames: downwardly emitted light-fluxes having a proportion of 55% or more.

Table 2 shows a proportion of downwardly emitted light fluxes to light fluxes emitted when predetermined diffusion light enters the incident surface, as obtained by the aforementioned calculation.

TABLE 2

| α (°) | β (°) | Proportion of Downwardly Emitted Light-Fluxes | | | |
|---|---|---|---|---|---|
| | | R = 0% | R = 10% | R = 20% | R = 30% |
| 0 | 20 | 48% | 51% | 52% | X |
| | 40 | 49% | 54% | 59% | X |
| | 60 | 55% | 58% | X | X |
| | 80 | 54% | X | X | X |
| 20 | 40 | 57% | 58% | 59% | X |
| | 60 | 62% | 60% | 60% | X |
| | 80 | 55% | 54% | X | X |
| 40 | 60 | 58% | 58% | 57% | 56% |
| | 80 | 53% | 53% | X | X |
| 45 | 45 | 50% | 50% | 50% | 50% |
| | 60 | 56% | 55% | 55% | 54% |
| | 80 | 53% | 52% | 52% | X |
| 60 | 80 | 49% | 51% | 51% | 51% |

X: There are no data or incircles satisfying a condition.

Values in shaded frames: downwardly emitted light-fluxes having a proportion of 55% or more.

Table 1 shows that if incident light ray is parallel light, in almost design conditions, a proportion of light rays emitted downwardly has 55% or more. On the other hand, if a diffusible light source is used, it is possible to have a proportion of 55% or more of downwardly emitted light fluxes only by a part of combination of values when the prism angle is set such that α<60, and 40 degrees≦β≦80 degrees, as shown in Table 2.

That is to say, it is shown that, in a case where the diffusion light enters the plastic sheet, it is not easy to deflect downwardly and emit the incident light by means of the plastic sheet including the lines of prisms having a flat and smooth surface and provided on the incident surface, compared to a case where the parallel light enters the plastic sheet. It is found from Table 2 that proportions of downwardly emitted light fluxes can be 55% or more by setting the values, in particular, α≦45, and 40 degrees≦β≦80 degrees.

As shown in FIG. 1, a back light-source for a decorative illumination signboard was prepared by disposing a fluorescent tube as a light source 2 at a position adjacent to the incident surface on which the prism lines of the plastic sheet 1 are provided, and disposing further a reflection member 3 in a rear of the light source. The prepared back light-source for the decorative illumination signboard was bright as viewed from below and was dark as viewed from above. By using the obtained back light-source for the decorative illumination signboard, and by disposing the display member 4 such as a transparent or half-transparent display sheet on which characters or pictures are displayed or liquid crystal panel, in the exit surface side, the decorative illumination signboard was produced.

DESCRIPTION OF REFERENCE NUMBERS

1: plastic sheet
2: light source
3: reflection member
4: display member

The invention claimed is:

1. A plastic sheet having optical transparency, comprising:
an exit surface; and
an incident surface on which a plurality of prism lines, having a smooth surface and a shape of a prism in a cross-section perpendicular to a longitudinal direction of a prism line, are aligned,
wherein:
the shape of the prism is formed by a side A on a lower side at an angle of α degrees to a normal line of the exit surface and a side B on an upper side at an angle of β degrees to the normal line of the exit surface;

α<β;

40 degrees≦β≦80 degrees; and an integral value of a downwardly emitted light flux is 55% or more of the total integral value of an upwardly emitted light flux and the downwardly emitting light flux when predetermined diffusion light enters one surface of the plastic sheet in a direction perpendicular to the plastic sheet.

2. The plastic sheet according to claim 1, wherein the prism includes a curved-surface portion on a top part of the prism.

3. The plastic sheet according to claim 2, wherein 0 degree<α<60 degrees.

4. The plastic sheet according to claim 3, wherein 40 degrees≦α+β≦105 degrees.

5. The plastic sheet according to claim 4, wherein the percentage of a ratio R of a pitch P of the prism lines to a radius r of an arc forming the curved-surface portion of the top of the prism, R=P/r, is greater than or equal to 5% and less than or equal to 30%.

6. The plastic sheet according to claim 5, wherein the pitch P of the prism lines is equal to or greater than 0.03 mm and equal to or less than 3 mm.

7. The plastic sheet according to claim 3, wherein the percentage of a ratio R of a pitch P of the prism lines to a radius r of an arc forming the curved-surface portion of the top of the prism, R=P/r, is greater than or equal to 5% and less than or equal to 30%.

8. The plastic sheet according to claim 7, wherein the pitch P of the prism lines is equal to or greater than 0.03 mm and equal to or less than 3 mm.

9. A decorative illumination signboard, comprising: the plastic sheet according to claim 2; and a light source device configured to allow the light to enter one surface of the plastic sheet.

10. The plastic sheet according to claim 2, wherein the percentage of a ratio R of a pitch P of the prism lines to a radius r of an arc forming the curved-surface portion of the top of the prism, R=P/r, is greater than or equal to 5% and less than or equal to 30%.

11. The plastic sheet according to claim 10, wherein the pitch P of the prism lines is equal to or greater than 0.03 mm and equal to or less than 3 mm.

12. The plastic sheet according to claim 1, wherein 0 degree<α<60 degrees.

13. The plastic sheet according to claim 12, wherein 40 degrees≦α+β≦105 degrees.

14. A decorative illumination signboard, comprising: the plastic sheet according to any one of claims 1 to 12; and a light source device configured to allow the light to enter one surface of the plastic sheet.

* * * * *